United States Patent [19]
Aimonetti et al.

[11] Patent Number: 6,046,885
[45] Date of Patent: Apr. 4, 2000

[54] BASE PLATE SUSPENSION ASSEMBLY IN A HARD DISK DRIVE WITH STEP IN FLANGE

[75] Inventors: Kim Aimonetti, San Jose; Kevin Hanrahan, Santa Barbara; William P. Heist, Morgan Hill; Ryan Schmidt, Santa Barbara; Larry Tucker, Fremont, all of Calif.

[73] Assignee: Intri-Plex Technologies, Inc., Goleta, Calif.

[21] Appl. No.: 09/055,220

[22] Filed: Apr. 3, 1998

[51] Int. Cl.[7] .................................................. G11B 5/54
[52] U.S. Cl. ............................................................ 360/104
[58] Field of Search .......................................... 360/104

[56] References Cited

U.S. PATENT DOCUMENTS 4,991,045  2/1991  Oberg ........................................ 360/104
5,689,389  11/1997  Braunheim ................................ 360/104

*Primary Examiner*—Robert S. Tupper
*Attorney, Agent, or Firm*—Owen L. Lamb

[57] ABSTRACT

A base plate having a hub, a flange having an outer flange region at an outer periphery of the flange and a clamping region at an inner periphery of the flange that is contiguous with the hub. The flange has a modified region that at least partially surrounds and is contiguous with the clamping region, the modified region having a stress reducing configuration such that the clamping region is thicker than the outer flange region. The modified region may be a circular or linear step, and can be on either side of the flange. The step fits the contour of a load beam and the flange is welded to the load beam. The load beam thickness is the same as or less than the thickness of the step.

20 Claims, 3 Drawing Sheets

BASE PLATE SUSPENSION ASSEMBLY IN A HARD DISK DRIVE WITH STEP IN FLANGE

BACKGROUND OF THE INVENTION

1. Field of the Invention

This invention relates to disk head assemblies for supporting read/write heads adjacent rotating disks in disk drives and more particularly, to a base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram Load". Air turbulence caused by the rotating disks lifts the heads slightly off of the disks so that the heads fly on an air bearing across the disk surfaces. The air bearing force is counteracted by the suspension gram load.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. In the prior art, a swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

Problems with this method of mounting transducer heads have arisen as the need for increased data storage capacity in hard disk drives has grown and/or the size of the disk drive has decreased to fit in small lap top computers. The problem of forming a strong connection between the actuator arms and the transducer suspensions has been made more difficult as the thickness of the components has become smaller.

A typical base plate has two primary regions, a flange region and a hub region. The flange region is a flat portion to which the load beam is welded. This area preferably remains flat and free from distortion so that it serves as a stable mounting feature for the load beam and ideally remains so throughout the swaging operation. The hub region is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm. A problem with this process is that the base plate flange becomes warped by stress from the hub during the swaging operation. Consequently, the load beam, which is welded to the base plate flange, is deformed by the warping of the base plate flange, adversely affecting the gram load on the transducer head.

It is, therefore, desirable to provide an actuator arm assembly for a magnetic disk unit in which a base plate provides a thicker flange region to absorb stress occurring during a swaging operation so that the base plate and a load beam welded thereto will not be warped.

It is also desirable to provide an actuator arm assembly for a magnetic disk unit in which a base plate provides a stack height reduction by a thickness equal to the thickness of the load beam.

SUMMARY OF THE INVENTION

This invention is concerned with a base plate comprising a hub and a flange. The flange has an outer flange region at an outer periphery of the flange and a clamping region that at least partially surrounds and is contiguous with the hub region. The flange has a modified region that at least partially surrounds and is contiguous with the clamping region, the modified region having a stress reducing configuration such that the clamping region is thicker than the outer flange region. The modified region may be a circular step or a linear step, and may be on the hub side of the base plate or on the flange side of the base plate.

In assembly, the outer flange region is fixed to a load beam in which the load beam has a boss clearance hole therein that receives the step region. Preferably, the load beam has a thickness that is equal to a thickness of the step.

An advantage of this invention is that it allows for a thicker base plate (by one load beam thickness) to be used thereby reducing swage gram load loss or allows for a stack height reduction for a head gimbal assembly (HGA) by one load beam thickness.

An advantage of this invention is that the modified region provides a more strain resistant region between the portion of the flange to which a load beam is welded and boss thereby reducing flange deformation and gram load loss due to swaging.

The modified region serves as strain border region between the outer portion of the flange where the load beam is welded and the inner portion of the flange which is clamped fully, thereby reducing outer flange deformation and gram load loss.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
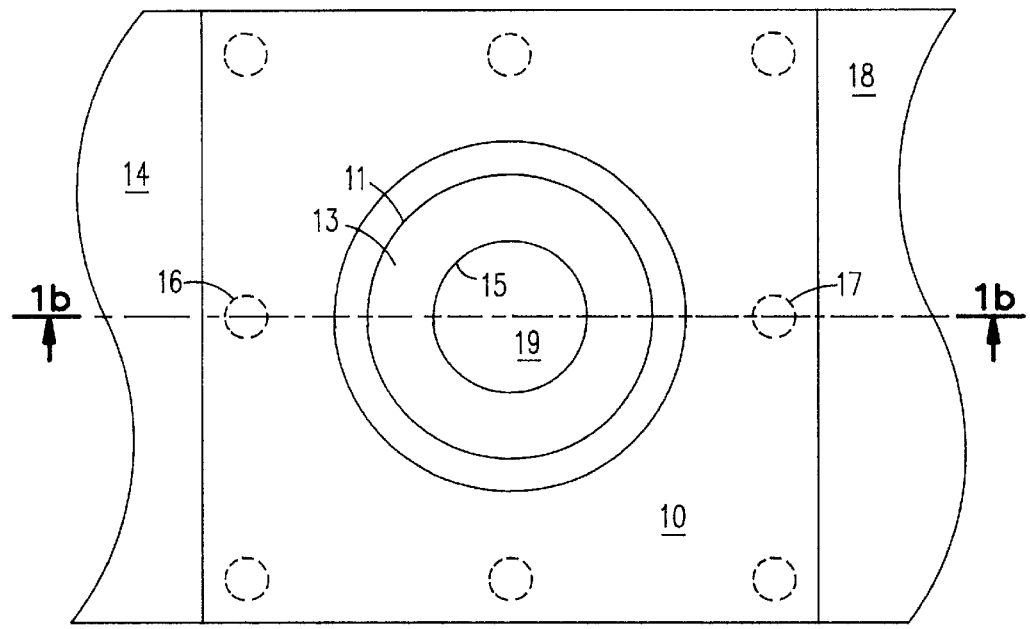
FIG. 1a is top view of a base plate of the prior art.
Figure 1B:
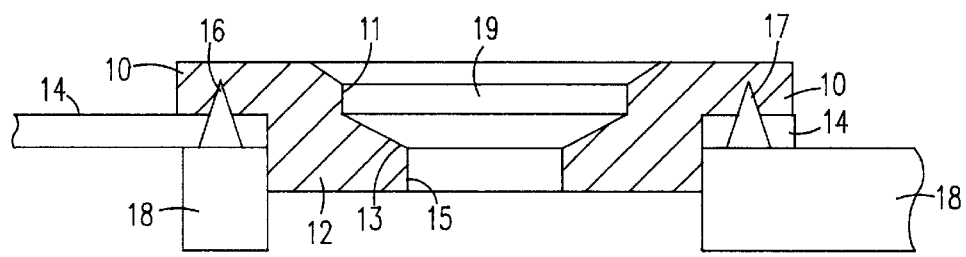
FIG. 1b is side elevation view of the base plate of FIG. 1a along the view line 1b—1b.

Refer to FIGS. 1a and 1b which illustrate a base plate of the prior art. An actuator arm and transducer suspension assembly, which are elements of a head stack assembly (HSA), are connected end to end by the base plate which is part of the transducer suspension assembly. The base plate includes a flat flange portion 10 and a cylindrical hub portion or boss 12. A base plate typically has an inner barrel shape with a counter bore 11, a lead-in chamfer 13 and an inner diameter 15. The counter bore and inner diameter are perpendicular to the plane of the base plate flange 10. The hub 12 is inserted through a load beam boss clearance hole in a load beam 14 and the flange portion 10 is welded 16, 17, etc. to the load beam. The hub is then inserted through an actuator arm boss hole in the actuator arm 18. A swage ball is passed through the center inner barrel 19 of the hub 12 causing pressure to be applied which causes the hub 12 to expand into the boss hole in the actuator arm, rigidly connecting the hub and attached load beam to the actuator arm boss hole.

Step Strain Border Region

The invention embodies a step in the flange on the hub side of the base plate or on a side opposite the hub. The step may be circular or linear. In either case, the outer edge flange material is preferably reduced in thickness by slightly more than the load beam thickness from a diameter of roughly 0.160 out to the edges of the flange. This configuration ensures that when a load beam with corresponding mating contour is welded on, it doesn't contact the arm at any time during the swage operation. This way the base plate has perfect clamping all the way in to the actuator arm hole inner diameter (ID). Also this invention either allows for a thicker (by one load beam thickness) base plate to be used thereby reducing swage gram loss or allows for a stack height reduction for the HGA by one load beam thickness.

In a first embodiment, the step is a raised circular area on the hub side or the side opposite the hub surrounding the hub outer diameter to a step height of, for example, 0.0035 inches. The boss clearance hole in the load beam is of a same corresponding diameter as the step diameter so that the raised area fits into the load beam boss clearance hole.

In a second embodiment, the step is a raised linear area on the hub side or on the side opposite the hub between the hub outer diameter and the flange edge to a step height of, for example, 0.0035 inches. The load beam is of a same corresponding shape as the step so that the raised area and the load beam fit together.

Step Is A Raised Circular Area

Figure 2A:
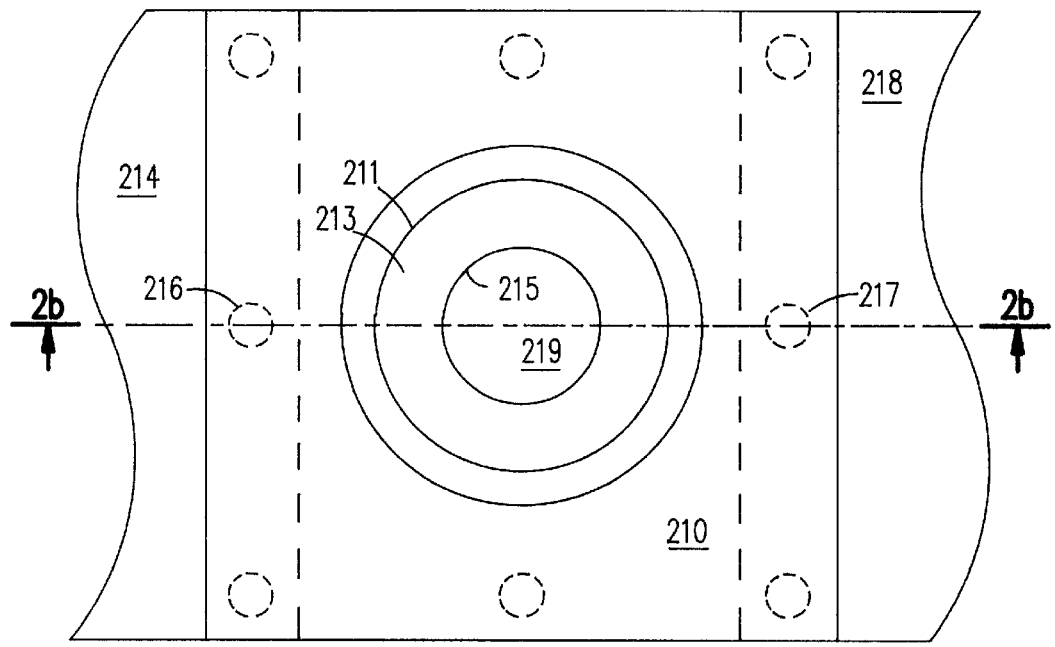
FIG. 2a is top view of a base plate illustrating a first embodiment of the invention.
Figure 2B:
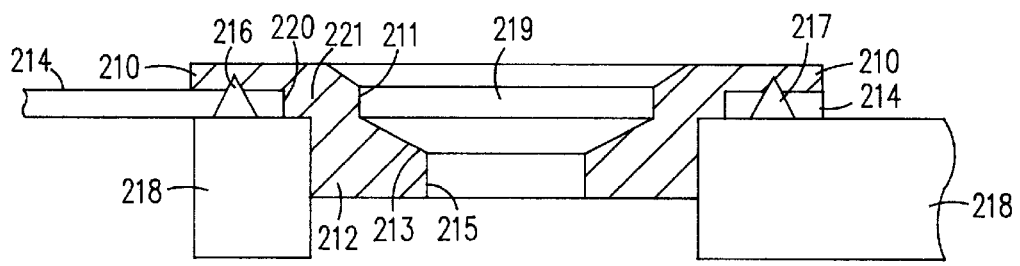
FIG. 2b is side elevation view of the base plate of FIG. 2a along the view line 2b—2b.
Figure 2C:
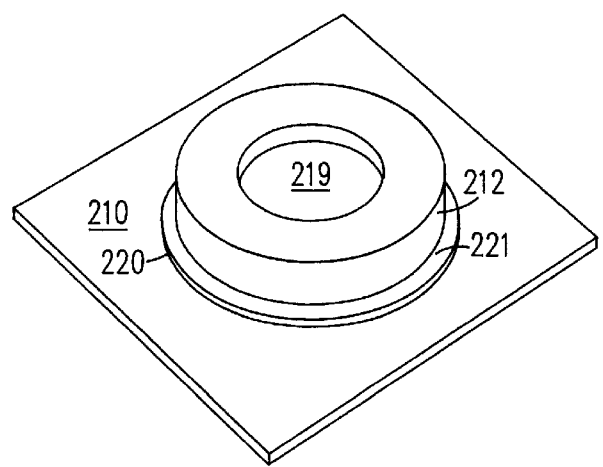
FIG. 2c is a perspective view of the base plate of FIGS. 2a and 2c.

Refer to FIGS. 2a, 2b, and 2c which illustrate a first embodiment of the invention. The base plate includes a flat flange portion 210 and a cylindrical hub portion or boss 212. The base plate has an inner barrel shape with a counter bore 211, a lead-in chamfer 213 and an inner diameter 215. The counter bore and inner diameter are perpendicular to the plane of the base plate flange 210. In assembling the actuator arm, the hub 212 and step 221 are inserted through a load beam boss clearance hole in a load beam 214. The load beam boss clearance hole is of such a diameter that the step fits in the load beam boss clearance hole. The flange portion 210 is welded 216, 217, to the load beam. Eight welds are illustrated by the broken line circles in FIG. 2a. The hub is then inserted through an actuator arm boss hole in the actuator arm 218. A swage ball is passed through the center inner barrel 219 of the hub 212 causing pressure to be applied to cause the hub 212 to expand into the boss hole in the actuator arm, rigidly connecting the hub and attached load beam to the actuator arm boss hole.

When a swage ball is forced through the inner barrel, the applied swage force or stress tends to strain or deform the base plate flange region 210 as the force is transmitted. The strain border region 220 in the vicinity of the step 221 isolates the flange region 210 from the hub region 212 and consequently from stress.

Step Is A Raised Linear Area

Figure 3A:
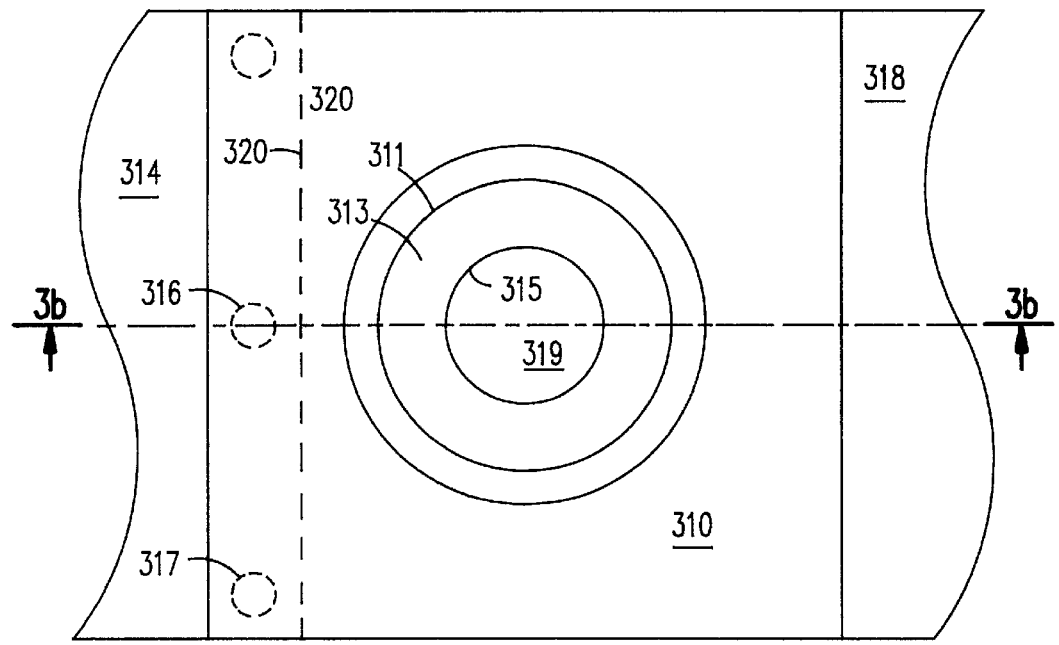
FIG. 3a is top view of a base plate illustrating a second embodiment of the invention.
Figure 3B:
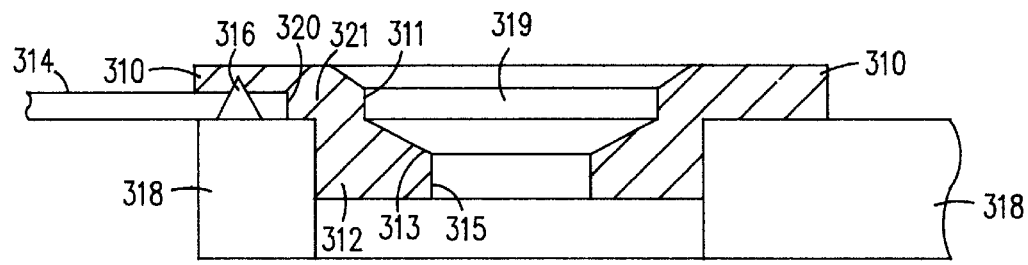
FIG. 3b is side elevation view of the base plate of FIG. 3a along the view line 3b—3b.
Figure 3C:
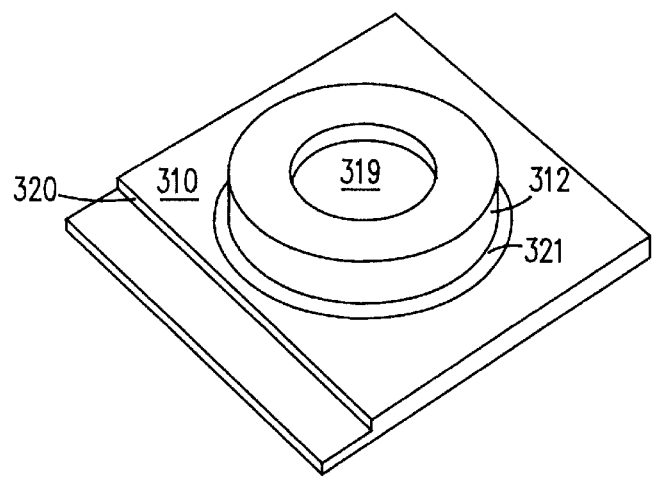
FIG. 3c is a perspective view of the base plate of FIGS. 3a and 3c.

Refer to FIGS. 3a, 3b, and 3c which illustrate a second embodiment of the invention. The base plate includes a flat flange portion 310 and a cylindrical hub portion or boss 312. The base plate has an inner barrel shape with a counter bore 311, a lead-in chamfer 313 and an inner diameter 315. The counter bore and inner diameter are perpendicular to the plane of the base plate flange 310. In assembling the actuator arm, the load beam 314 is fitted to the step 321. The flange portion 310 is welded 316, 317, to the load beam. Three welds are illustrated by the broken line circles in FIG. 3a. The hub 312 is then inserted through an actuator arm boss hole in the actuator arm 318. A swage ball is passed through the center inner barrel 319 of the hub 312 causing pressure to be applied to cause the hub 312 to expand into the boss hole in the actuator arm, rigidly connecting the hub and attached load beam to the actuator arm boss hole.

When a swage ball is forced through the inner barrel, the applied swage force or stress tends to strain or deform the base plate flange region 310 as the force is transmitted. The strain border region 320 in the vicinity of the step 321 isolates the flange region 310 from the hub region 312 and consequently from stress.

Variations in Location of Step

Figure 4:
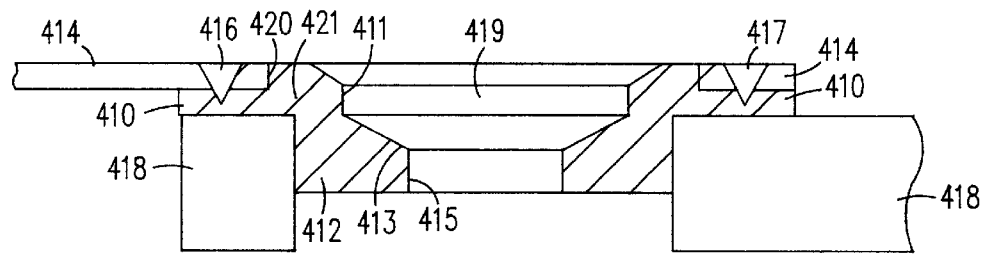
FIG. 4 is side elevation view of a variation of the base plate of FIG. 2 along the view line 2b—2b; and, FIG. 5 is side elevation view of a variation of the base plate of FIG. 3 along the view line 3b—3b.

Refer to FIG. 4 which is side elevation view of a variation of the base plate of FIG. 2. In this variation, the circular step is on the side of the base plate that is opposite the hub. The base plate includes a flange portion 410 and a cylindrical hub portion or boss 412. The base plate has an inner barrel shape with a counter bore 411, a lead-in chamfer 413 and an inner diameter 415. The counter bore and inner diameter are perpendicular to the plane of the base plate flange 410. In assembling the actuator arm, the hub 412 and step 421 are inserted through a load beam boss clearance hole in a load beam 414. The load beam boss clearance hole is of such a diameter that the step fits in the load beam boss clearance hole. The flange portion 410 is welded 416, 417, to the load beam. The hub is then inserted through an actuator arm boss hole in the actuator arm 418. A swage ball is passed through the center inner barrel 419 of the hub 412 causing pressure to be applied to cause the hub 412 to expand into the boss hole in the actuator arm, rigidly connecting the hub and attached load beam to the actuator arm boss hole.

When a swage ball is forced through the inner barrel, the applied swage force or stress tends to strain or deform the base plate flange region 410 as the force is transmitted. The strain border region 420 in the vicinity of the step 421 isolates the flange region 410 from the hub region 412 and consequently from stress.

Figure 5:
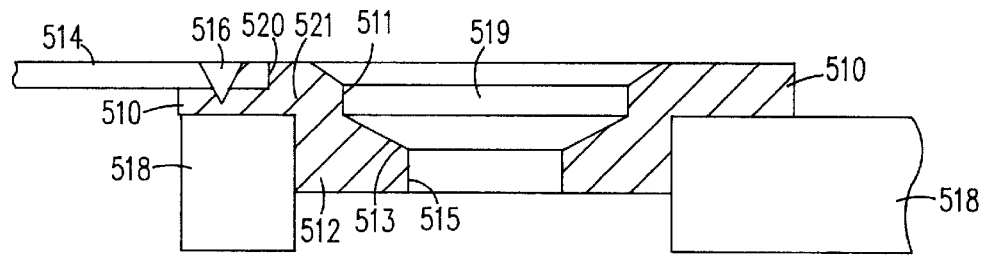

Refer to FIG. 5 which is side elevation view of a variation of the base plate of FIG. 3. In this variation, the linear step is on the side of the base plate that is opposite the hub. The base plate includes a flat flange portion 510 and a cylindrical hub portion or boss 512. The base plate has an inner barrel shape with a counter bore 511, a lead-in chamfer 513 and an inner diameter 515. The counter bore and inner diameter are perpendicular to the plane of the base plate flange 510. In assembling the actuator arm, the load beam 514 is fitted to the step 521. The flange portion 510 is welded 516, to the load beam. The hub 512 is then inserted through an actuator arm boss hole in the actuator arm 518. A swage ball is passed through the center inner barrel 519 of the hub 512 causing pressure to be applied to cause the hub 512 to expand into the boss hole in the actuator arm, rigidly connecting the hub and attached load beam to the actuator arm boss hole.

When a swage ball is forced through the inner barrel, the applied swage force or is stress tends to strain or deform the base plate flange region 510 as the force is transmitted. The strain border region 520 in the vicinity of the step 521 isolates the flange region 510 from the hub region 512 and consequently from stress.

Summary

A base plate comprising a hub and a flange is disclosed. The flange has an outer flange region at an outer periphery of the flange and a clamping region that surrounds and is contiguous with the hub region. The flange has a modified region that at least partially surrounds and is contiguous with the clamping region, the modified region having a stress reducing configuration such that the clamping region is thicker than the outer flange region. The modified region may be a circular or linear step, and can be on either side of the flange.

While the invention has been particularly shown and described with reference to preferred embodiments thereof, it Will be understood by those skilled in the art that the foregoing and other changes in form and detail may be made therein without departing from the scope of the invention.

What is claimed is:

1. A base plate comprising:

a hub; and, a flange;

said flange having an outer flange region at an outer periphery of said flange and a clamping region that surrounds and is contiguous with said hub;

said flange having a modified region that at least partially surrounds and is contiguous with said clamping region, said modified region having a stress reducing configuration such that said clamping region is thicker than said outer flange region.

2. A metal base plate comprising:

a metal hub; and, a metal flange;

said flange having an outer flange region at an outer periphery of said flange and a clamping region that surrounds and is contiguous with said hub;

said flange having a step strain border region that includes a step that at least partially surrounds and is contiguous with said clamping region, said clamping region being thicker than said outer flange region.

3. The base plate of claim 2 wherein:

said step delineates a border between said outer periphery of said flange and said clamping region as a raised area having a circular shape.

4. The base plate of claim 2 wherein:

said step delineates a border between said outer periphery of said flange and said clamping region as a raised area having a linear shape.

5. The base plate of claim 3 wherein:

said step is on a hub side of said flange.

6. The base plate of claim 3 wherein:

said step is on a side of said flange that is opposite said hub.

7. The base plate of claim 4 wherein:

said step is on a hub side of said flange.

8. The base plate of claim 4 wherein:

said step is on a side of said flange that is opposite said hub.

9. The base plate of claim 5 wherein:

said outer flange region is fixed to a load beam.

10. The base plate of claim 6 wherein:

said outer flange region is fixed to a load beam.

11. The base plate of claim 7 wherein:

said outer flange region is fixed to a load beam.

12. The base plate of claim 8 wherein:

said outer flange region is fixed to a load beam.

13. The base plate of claim 9 wherein:

said load beam has a thickness that is equal to a thickness of said step.

14. The base plate of claim 10 wherein:

said load beam has a thickness that is equal to a thickness of said step.

15. The base plate of claim 11 wherein:

said load beam has a thickness that is equal to a thickness of said step.

16. The base plate of claim 12 wherein:

said load beam has a thickness that is equal to a thickness of said step.

17. The base plate of claim 9 wherein:

said load beam has a thickness that is less than a thickness of said step.

18. The base plate of claim 10 wherein:

said load beam has a thickness that is less than a thickness of said step.

19. The base plate of claim 11 wherein:

said load beam has a thickness that is less than a thickness of said step.

20. The base plate of claim 12 wherein:

said load beam has a thickness that is less than a thickness of said step.

* * * * *